(12) United States Patent
Lee et al.

(10) Patent No.: US 9,910,314 B2
(45) Date of Patent: Mar. 6, 2018

(54) LIQUID CRYSTAL DISPLAY DEVICE HAVING DUAL COLOR FILTER PATTERNS AND MANUFACTURING METHOD THEREOF

(71) Applicant: Samsung Display Co., Ltd., Yongin-Si, Gyeonggi-Do (KR)

(72) Inventors: Yun Ho Lee, Yongin (KR); Jin A Seo, Yongin (KR); Myung Jin Lee, Yongin (KR); Chul Huh, Yongin (KR)

(73) Assignee: Samsung Display Co., Ltd. (KR)

( * ) Notice: Subject to any disclaimer, the term of this patent is extended or adjusted under 35 U.S.C. 154(b) by 65 days.

(21) Appl. No.: 14/992,927

(22) Filed: Jan. 11, 2016

(65) Prior Publication Data
US 2016/0216554 A1 Jul. 28, 2016

(30) Foreign Application Priority Data
Jan. 22, 2015 (KR) .................. 10-2015-0010779

(51) Int. Cl.
G02F 1/1335 (2006.01)
G02F 1/1362 (2006.01)

(52) U.S. Cl.
CPC ...... *G02F 1/133514* (2013.01); *G02F 1/1362* (2013.01); *G02F 2001/136222* (2013.01)

(58) Field of Classification Search
CPC ............... G02F 1/133514; G02F 2001/136222
See application file for complete search history.

(56) References Cited

U.S. PATENT DOCUMENTS

| | | | |
|---|---|---|---|
| 2007/0146915 A1 | 6/2007 | Yang et al. | |
| 2009/0310069 A1* | 12/2009 | Do | ............... G02F 1/133514 349/107 |
| 2010/0182549 A1* | 7/2010 | Miyashita | ......... G02F 1/133514 349/106 |
| 2012/0145972 A1 | 6/2012 | Lee et al. | |
| 2014/0158952 A1 | 6/2014 | Jeong et al. | |
| 2014/0158953 A1 | 6/2014 | Choi et al. | |
| 2014/0168805 A1 | 6/2014 | Sugishima et al. | |
| 2014/0177081 A1 | 6/2014 | Sugishima et al. | |
| 2015/0170605 A1* | 6/2015 | Watakabe | ......... G02F 1/133514 345/600 |

FOREIGN PATENT DOCUMENTS

| | | |
|---|---|---|
| KR | 1020020065027 A | 8/2002 |
| KR | 100703524 B1 | 3/2007 |
| KR | 20120065135 A | 6/2012 |
| KR | 1020130101850 A | 9/2013 |
| KR | 1020130134633 A | 12/2013 |
| KR | 20140068044 A | 6/2014 |
| KR | 20140068910 A | 6/2014 |

(Continued)

*Primary Examiner* — Jia Pan
(74) *Attorney, Agent, or Firm* — Innovation Counsel LLP

(57) ABSTRACT

There are provided a display device having dual color filter patterns and a manufacturing method thereof. The liquid crystal display device includes an array substrate including first color filter patterns, a counter substrate including second color filter patterns, and a liquid crystal layer interposed between the array substrate and the counter substrate, wherein the first color filter patterns and the second color filter patterns include photoresists having different color coordinates.

4 Claims, 3 Drawing Sheets

(56) References Cited

FOREIGN PATENT DOCUMENTS

| KR | 20140073997 A | 6/2014 |
|----|---------------|--------|
| KR | 20140073999 A | 6/2014 |
| KR | 1020140074188 A | 6/2014 |
| KR | 1020140074189 A | 6/2014 |
| KR | 1020140082203 A | 7/2014 |

* cited by examiner

LIQUID CRYSTAL DISPLAY DEVICE HAVING DUAL COLOR FILTER PATTERNS AND MANUFACTURING METHOD THEREOF

CROSS-REFERENCE TO RELATED APPLICATION

This application claims priority to and the benefit of Korean Patent Application No. 10-2015-0010779, filed on Jan. 22, 2015, in the Korean Intellectual Property Office, the entire contents of which are incorporated herein by reference in their entirety.

BACKGROUND

1. Field

The present application relates to a display device having dual color filter patterns and a manufacturing method thereof. In more detail, the present application relates to a display device in which color filter patterns are formed of photoresist having different color coordinates on upper and lower substrates to provide various color coordinate combinations, and a manufacturing method thereof.

2. Description of the Related Art

In general, a display device includes a display panel displaying an image using light and a backlight assembly providing light to the display panel. The display panel includes a plurality of pixel cells each including a switching element, a pixel electrode, a common electrode, and a color layer. The display panel may use a liquid crystal layer as a display element. As light provided by the backlight assembly passes through the color layer, the display device may display a color image based on an additive mixture of color. The color layer may include, for example, a red color filter, a green color filter, and a blue color filter, and may represent various colors by mixing color light which has passed through the color filters.

Recently, great efforts to develop high color density have been made according to environments in which high color gamut is required, but a problem such as an increase in production cost arises.

In particular, it is very difficult to implement green having high color density, it is very difficult to prepare photoresist having a high color gamut equal to or greater than Gy 0.640 (C light source) with a combination of G58/Y138, a general green dye, and application of G7/Y129 having high tinting strength inevitably degrades transmittance.

SUMMARY

An embodiment relates to a liquid crystal display device capable of improving a color gamut by applying dual color filter patterns.

A liquid crystal display device according to an embodiment includes: an array substrate including first color filter patterns; a counter substrate including second color filter patterns; and a liquid crystal layer interposed between the array substrate and the counter substrate, wherein the first color filter patterns and the second color filter patterns include photoresists having different color coordinates.

The first color filter patterns may be RGB patterns and include photoresists including pigments of C.I. pigment red 177, C.I. pigment green 58, and C.I. pigment blue 15:6, respectively, and the second color filter patterns may be RGB patterns and include photoresists including pigments of C.I. pigment red 254, C.I. pigment yellow 138, and C.I. pigment violet 23, respectively. In another embodiment, the second color filter patterns may be RGB patterns and include photoresists including pigments of C.I. pigment red 177, C.I. pigment green 58, and C.I. pigment blue 15:6, and the first color filter patterns may be RGB patterns and include photoresists including pigments of C.I. pigment red 254, C.I. pigment yellow 138, and C.I. pigment violet 23, respectively.

The second color filter patterns may be RGB patterns and include photoresists including red, green, and blue pigments, respectively, and the first color filter patterns may be a green (G) pattern and include photoresist including green pigment in a portion corresponding to a G pattern of the second color filter patterns. In another embodiment, the first color filter patterns may be RGB patterns and include photoresists including red, green, and blue pigments, respectively, and the second color filter patterns may be a green (G) pattern and include a photoresist including a green pigment in a portion corresponding to a G pattern of the first color filter pattern.

Various color coordinates may be implemented by controlling thicknesses of the first color filter patterns and the second color filter patterns.

Gate and data lines intersecting each other to define pixel regions, a thin film transistor (TFT) connected to the gate and data lines, the first color filter patterns, and a pixel electrode connected to the TFT may be formed on an inner surface of the array substrate. A black matrix corresponding to the gate and data lines and the TFT, the second color filter patterns, and a common electrode covering the black matrix and the second color filter patterns may be formed on an inner surface of the counter substrate.

A method for manufacturing a liquid crystal display device according to an embodiment includes: forming an array substrate; forming a counter substrate; and coupling the array substrate and the counter substrate. The forming of the array substrate includes: forming a thin film transistor (TFT) on a lower substrate; forming first color filter patterns on the lower substrate; and forming a pixel electrode connected to the TFT. The forming of the counter substrate includes: forming a black matrix and second color filter patterns on an upper substrate; and forming a common electrode covering the black matrix and the second color filter patterns.

The first color filter patterns may be formed of photoresists including pigments of C.I. pigment red 177, C.I. pigment green 58, and C.I. pigment blue 15:6, respectively, and the second color filter patterns may be formed of photoresists including pigments of C.I. pigment red 254, C.I. pigment yellow 138, and C.I. pigment violet 23, respectively. In another embodiment, the second color filter patterns may be formed of photoresists including pigments of C.I. pigment red 177, C.I. pigment green 58, and C.I. pigment blue 15:6, and the first color filter patterns may be formed of photoresists including pigments of C.I. pigment red 254, C.I. pigment yellow 138, and C.I. pigment violet 23, respectively.

The first color filter patterns may be formed of photoresists including red, green, and blue pigments, respectively, and the second color filter patterns may be formed of a photoresist including a green pigment in a portion corresponding to a green (G) pattern of the first color filter patterns. In another embodiment, the second color filter patterns may be formed of photoresists including red, green, and blue pigments, respectively, and the first color filter patterns may be formed of a photoresist including a green pigment in a portion corresponding to a green (G) pattern of the second color filter patterns.

According to an embodiment, since the array and counter substrates include color filter patterns, it is possible to obtain a high color gamut.

Also, according to an embodiment, it is possible to implement various color coordinates by controlling thicknesses of the dual color filter patterns.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will full convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Example embodiments will now be described more fully hereinafter with reference to the accompanying drawings; however, they may be embodied in different forms and should not be construed as limited to the embodiments set forth herein.

Figure 1:
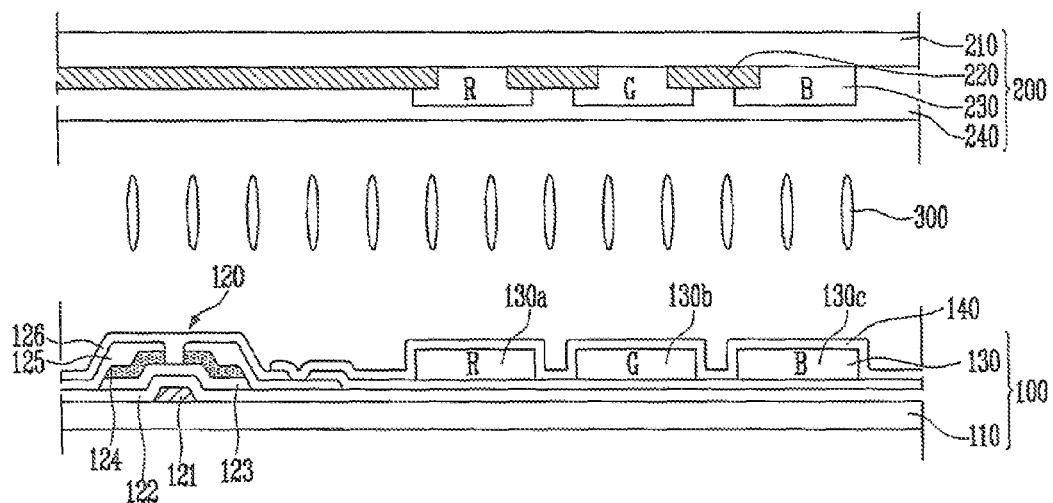
FIG. 1 is a cross-sectional view illustrating a liquid crystal display device according to an embodiment.
Figure 2:
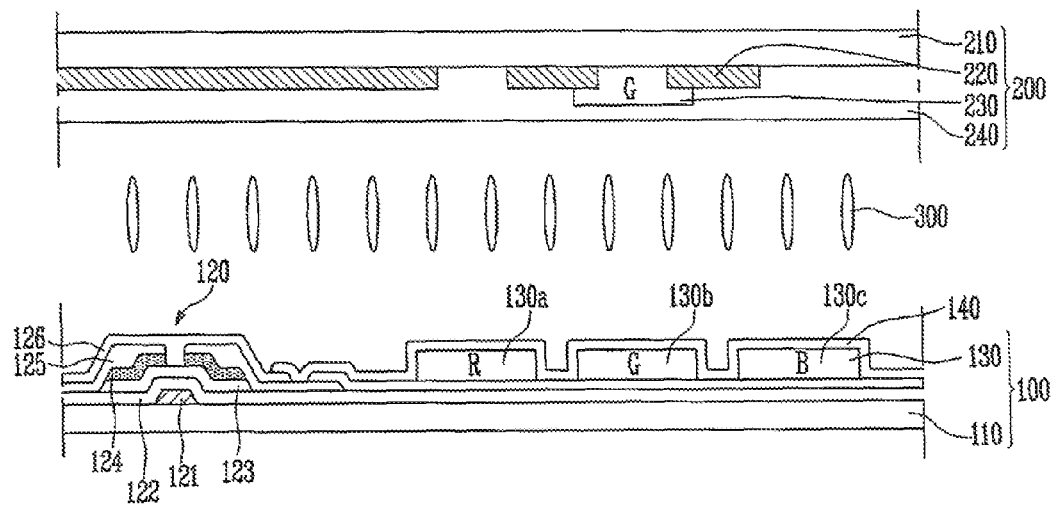
FIG. 2 is a cross-sectional view illustrating a liquid crystal display device according to another embodiment.

FIG. 1 is a cross-sectional view illustrating a liquid crystal display device according to a first embodiment, and FIG. 2 is a cross-sectional view illustrating a liquid crystal display device according to a second embodiment.

Referring to FIGS. 1 and 2, a liquid crystal display (LCD) device according to this embodiment includes an array substrate 100, a counter substrate 200 facing the array substrate 100, and a liquid crystal layer 300 interposed therebetween, like a general LCD device. When light passing through the array substrate 100 sequentially passes through the liquid crystal layer 300 and the counter substrate 200, liquid crystal molecules of the liquid crystal layer 300 may adjust transmittance of the light, whereby the LCD device displays an image. The LCD device may display a color image by color filter patterns 130 and 230 respectively formed on the array substrate 100 and the counter substrate 200.

The liquid crystal layer 300 is formed of a material having dielectric anisotropy and refraction index anisotropy, and rotates based on a difference between a pixel voltage from a pixel electrode 140 and a common voltage from a common electrode 240 to adjust light transmittance.

The array substrate 100, sometimes called a thin film transistor (TFT) substrate, includes a TFT 120 formed on a lower substrate 110, the first color filter patterns 130, and the pixel electrode 140 connected to the TFT 120 and formed in a pixel region.

Each pixel of the LCD device includes the TFT 120 and the pixel electrode 140. The TFT 120 may include a control electrode (a gate electrode 121) and input and output electrodes (source and drain electrodes 125) connected to signal lines (not shown) formed on the lower substrate 110, and the output electrodes may be connected to the pixel electrode 140.

The TFT 120 supplies a data voltage supplied from a data line in response to a scan signal supplied from a gate line, to the pixel electrode 140. To this end, the TFT 120 includes the gate electrode 121, a gate insulating layer 122, an active layer 123, an ohmic-contact layer 124, the source and drain electrodes 125, a protective layer 126, and the like.

The first color filter patterns 130 are formed of photoresist including R (red), G (green), and B (Blue) color pixels.

The pixel electrode 140 charges a pixel voltage according to a data voltage supplied from the TFT 120 to generate a potential difference from the common electrode 240 formed on the counter substrate 200. Due to the potential difference, the liquid crystal molecules of the liquid crystal layer 300 positioned between the array substrate 100 and the counter substrate 200 rotate by dielectric anisotropy, and an amount of light incident by way of the pixel electrode 140 from a backlight assembly is adjusted to be transmitted toward the counter substrate 200.

The counter substrate 200, sometimes called a color filter substrate, includes a black matrix 220, the second color filter patterns 230, and the common electrode 240 formed on an upper substrate 210.

The black matrix 220 formed on the upper substrate 210 is generally formed on a non-display region in which a sealant coupling the upper and lower substrates 210 and 110, a boundary region (not shown) of a pixel, and a TFT (not shown) to prevent light leakage and a light degradation of a channel layer of the TFT. As a material of the black matrix 220, in general, an organic material or a metal material such as chromium, or the like, may be used. However, since a chromium black matrix causes an environmental problem, currently, it has been replaced with an organic black matrix.

The second color filter patterns 230 are formed on the black matrix 220. The second color filter patterns 230 are formed of photoresist including R (red), G (green), and B (blue) color pixels in positions corresponding to the first color filter patterns 130.

An overcoating layer may be formed on the black matrix 220 and the second color filter patterns 230 in order to protect a planarization layer and the second color filter patterns 230, or the like.

The common electrode 240 formed thereon supplies a common voltage as a reference when the liquid crystal layer 300 is driven to a transparent conductive layer.

The first color filter patterns 130 included in the array substrate 100 and the second color filter patter 230 included in the counter substrate 200 may be formed using pigments having different color coordinates. In detail, e.g., as illustrated in FIG. 1, the first color filter patterns 130 may be RGB patterns formed of photoresist including pigments of C.I. pigment red 177 represented by the following chemical formula 1, C.I. pigment green 58 represented by the following chemical formula 2, and C.I. pigment blue 15:6 represented by the following chemical formula 3, and the second color filter patterns 230 may be RGB patterns formed of photoresist including pigments of C.I. pigment red 254 represented by the following chemical formula 4, C.I. pigment yellow 138 represented by the following chemical formula 5, and C.I. pigment violet 23 represented by the following chemical formula 6. Also, in another embodiment, the second color filter patterns 230 may be RGB patterns formed of photoresist including pigments of C.I. pigment red 177, C.I. pigment green 58, and C.I. pigment blue 15:6, and the first color filter patterns 130 may be RGB patterns formed of photoresist including pigments of C.I. pigment red 254, C.I. pigment yellow 138, and C.I. pigment violet 23.

Chemical Formula 1

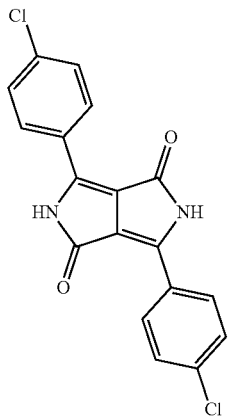

Chemical Formula 2

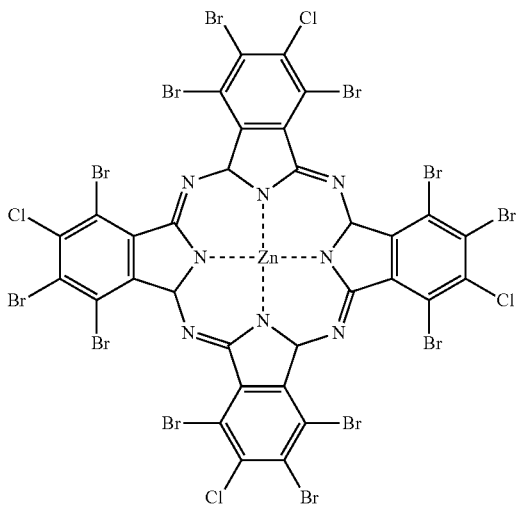

Chemical Formula 3

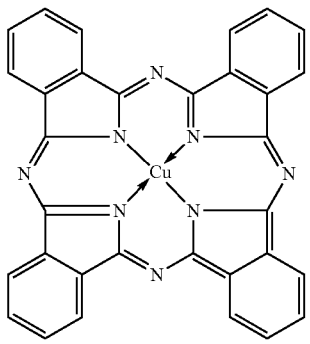

Chemical Formula 4

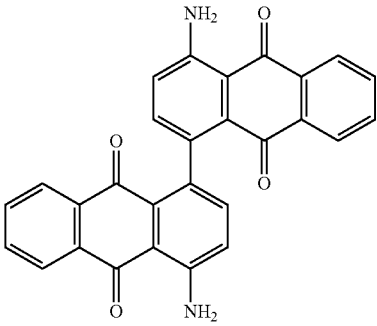

Chemical Formula 5

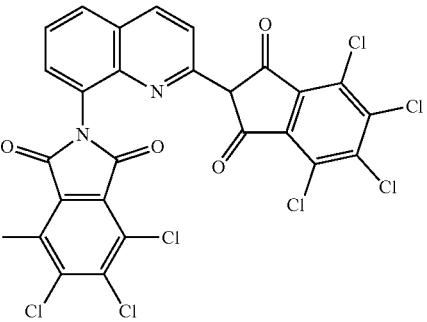

Chemical Formula 6

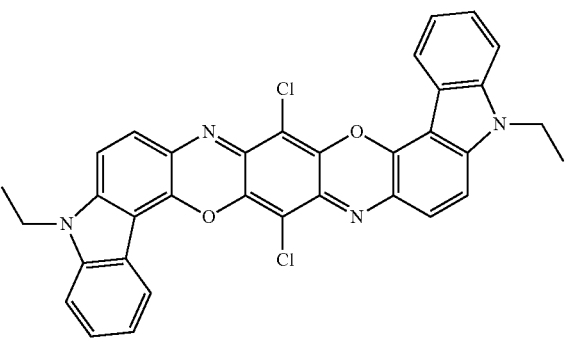

In another embodiment, e.g., as illustrated in FIG. 2, the first color filter patterns 130 may be RGB patterns formed of photoresist including red, green, and blue pigments and the second color filter patterns 230 may be a green G pattern formed of photoresist including green pigment in a portion corresponding to a green G pattern of the first color filter patter 130. In another embodiment, the second color filter patterns 230 may be RGB patterns formed of photoresist including red, green, and blue pigments and the first color filter patterns 130 may be a green G pattern formed of photoresist including pigment in a portion corresponding to the green G pattern of the second color filter patterns 230. Here, the red and green pigments used in forming the RGB patterns may be pigments which are generally used, and also, green pigment used for forming the green (G) pattern may be a pigment generally used in the art, and a pigment which is the same as or different from the green pigment of the RGB patterns may be used.

In addition, various color coordinates may be implemented by controlling thicknesses of the first color filter patterns 130 and the second color filter patterns 230.

The first color filter patterns 130 and the second color filter patterns 230 may be formed of a general photoresist composition for making color filters, and the composition may include a binder resin, a monomer, a photo initiator, pigment, and an organic solvent. Colors represented by the color filters formed by the photoresist composition may be determined by the color represented by the pigment.

Hereinafter, a process of forming the first color filter patterns 130 and the second color filter patterns 230 on the array substrate 100 and the counter substrate 200 will be described with reference to FIGS. 1 and 2.

Figure 3A:
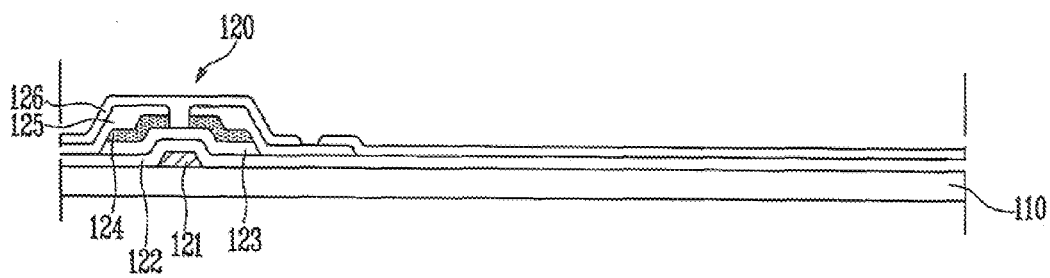
FIGS. 3A, 3B, and 3C are views illustrating sequential processes of manufacturing an array substrate of the liquid crystal display device according to an embodiment.
Figure 3B:
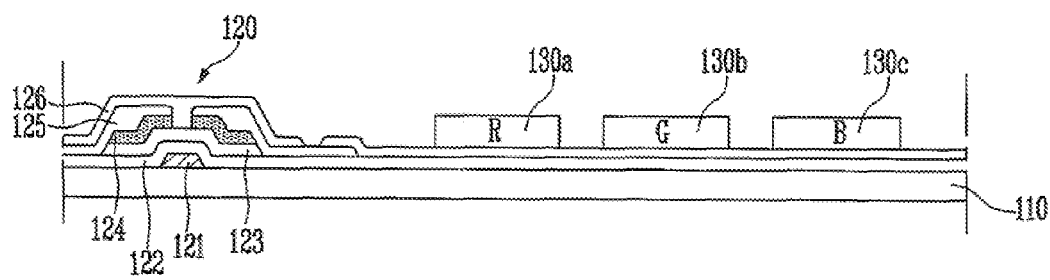
Figure 3C:
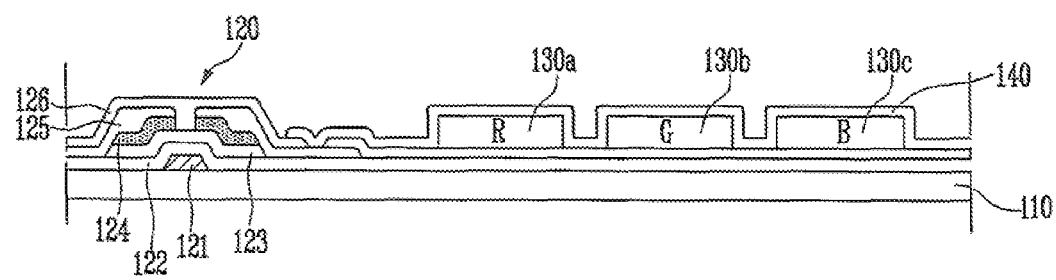

FIGS. 3A through 3C are views illustrating sequential processes of forming the color filter patterns 130 on the array substrate 100 according to an embodiment.

Referring to FIG. 3A, the TFT 120 is formed on the lower substrate 110 of the array substrate 100. During the process of forming the TFT 120, signal lines connected to the TFT 120 are also formed. The TFT 120 may be formed through a general method in the art.

A photoresist composition for making color filters is applied to the lower substrate 110 with the TFT 120 formed thereon. The photoresist composition for making color filters includes a binder resin, a monomer, a photo initiator, a pigment compound, and an organic solvent. The photoresist composition for making color filters may be substantially the same as that of a general photoresist composition in the art, and thus, a detailed description thereof will be omitted.

For example, a photoresist composition used to form a first color filter pattern 130a representing red may include pigment compounds such as C.I. pigment red 177 or C.I. pigment red 254.

Subsequently, light is provided to the photoresist composition applied to the lower substrate 110. During an exposure process of the photoresist composition, a mask including a light blocking portion and a light transmission portion may be used, and in the photoresist composition of a region corresponding to the light transmission portion, the binder polymer and the monomer may chemically react with each other.

After the exposure process, the photoresist composition may be developed to preliminarily form the first color filter pattern 130a. During the developing process, the photoresist composition of the region corresponding to the light transmission portion remains on the lower substrate 110 and the photoresist composition of the region corresponding to the light blocking portion is removed from the lower substrate 110 by a developer.

Subsequently, the lower substrate 110 including the exposed and developed photoresist composition is heat-treated. By heat-treating the lower substrate 110, the first color filter pattern 130a illustrated in FIG. 3B may be finally formed.

Through a process substantially the same as the process of forming the first color filter pattern 130a, the first color filter pattern 130b and the first color filter pattern 130c may be formed. Here, the photoresist composition forming the first color filter pattern 130b may include pigment compounds such as C.I. pigment green 58 or C.I. pigment yellow 138, and the photoresist composition forming the first color filter pattern 130c includes pigment compounds such as C.I. pigment blue 15:6 or C.I. pigment violet 23.

After forming the first color filter patterns 130a, 130b, and 130c, as illustrated in FIG. 3C, the pixel electrode 140 is formed on the lower substrate 110. Accordingly, the array substrate 100 illustrated in FIG. 1 may be manufactured.

Figure 4A:
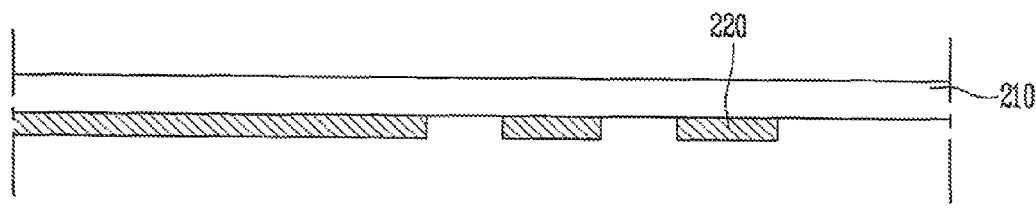
FIGS. 4A, 4B, and 4C are views illustrating sequential processes of manufacturing a counter substrate of the liquid crystal display device according to an embodiment.
Figure 4B:
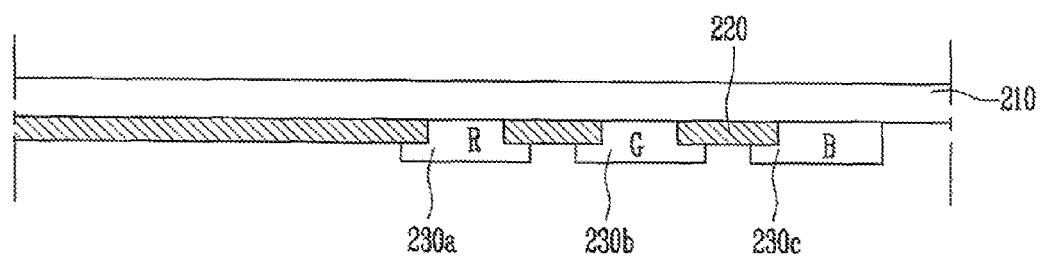
Figure 4C:
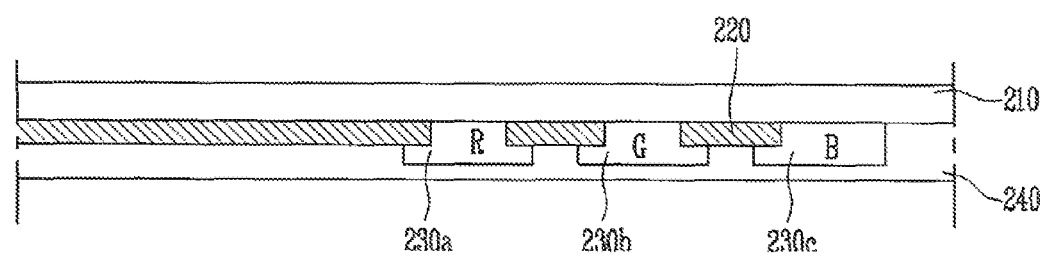

FIGS. 4A through 4C are views illustrating sequential processes of manufacturing the second color filter patterns 230 on the counter substrate 200 according to an embodiment.

Referring to FIG. 4A, the black matrix 220 is formed on the upper substrate 210 of the counter substrate 200. The black matrix 220 may be formed on the upper substrate 210 through patterning using photo-etching process. Alternatively, the black matrix 220 may also be formed by locally jetting an organic material using an ink jet method.

Subsequently, a photoresist composition for making color filters is applied to the upper substrate 210 with the black matrix 220 formed thereon.

The photoresist composition for making color filters includes a binder resin, a monomer, a photo initiator, a pigment compound, and an organic solvent. The photoresist composition for making color filters is substantially the same as a general photoresist composition in the art, and thus, a detailed description thereof will be omitted.

For example, a photoresist composition used to form the second color filter pattern 230a representing red may include pigment compounds such as C.I. pigment red 177 or C.I. pigment red 254.

Subsequently, light is provided to the photoresist composition applied to the upper substrate 210. During an exposure process of the photoresist composition, a mask including a light blocking portion and a light transmission portion may be used, and in the photoresist composition of a region corresponding to the light transmission portion, the photo initiator may be activated and the binder polymer and the monomer may chemically react with each other.

After the exposure process, the photoresist composition is developed to preliminarily form the second color filter pattern 230a. During the developing process, the photoresist composition of the region corresponding to the light transmission portion remains on the upper substrate 210 and the photoresist composition of the region corresponding to the light blocking portion is removed from the upper substrate 210 by a developer.

Subsequently, the upper substrate 210 including the exposed and developed photoresist composition is heat-treated. By heat-treating the upper substrate 210, the second color filter pattern 230a illustrated in FIG. 4B may be finally formed.

Through a process substantially same as the process of forming the second color filter pattern 230a, the second color filter pattern 230b and the second color filter pattern 230c may be formed. Here, the photoresist composition forming the second color filter pattern 230b may include pigment compounds such as C.I. pigment green 58 or C.I. pigment yellow 138, and the photoresist composition forming the second color filter pattern 230c includes pigment compounds such as C.I. pigment blue 15:6 or C.I. pigment violet 23.

After forming the second color filter patterns 230a, 230b, and 230c, as illustrated in FIG. 4C, the common electrode 240 is formed on the upper substrate 210. Accordingly, the counter substrate 200 illustrated in FIG. 1 may be manufactured.

The common electrode 240 may be formed by depositing indium tin oxide (ITO), indium zinc oxide (IZO), and the like, transparent electrode materials having excellent transmittance and conductivity and chemical, thermal stability on the upper substrate 210 with the second color filter patterns 230 formed thereon through sputtering.

The common electrode 240 serves to operate a liquid crystal cell together with the pixel electrode 140 formed on the array substrate 100.

Meanwhile, an overcoat layer may be formed to planarize the surface of the second color filter patterns 230 before the common electrode 240 is formed. In this case, since a wavelength region absorbing light extends, a function thereof as a black matrix may be enhanced.

As the lower substrate 110 of the array substrate 100 and the upper substrate 210 of the counter substrate 200, transparent insulating substrates may be used, or a flexible substrate may be used.

The array substrate 100 formed through the processes illustrated in FIGS. 3A through 3C and the counter substrate 200 formed through the processes illustrated in FIGS. 4A through 4C are coupled by a sealant, for example, through a general method in the art to manufacture a liquid crystal display device.

The liquid crystal display device including the first color filter patterns 130 formed with pigments of C.I. pigment red 177, C.I. green 58, and C.I. pigment blue 15:6 and the second color filter patterns 230 formed with pigments of C.I. pigment red 254, C.I. pigment yellow 138, and C.I. pigment violet 23 respectively on the array substrate 100 and the counter substrate 200 have the dual-color filter patterns, thereby obtaining a high color gamut without degrading transmittance.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the inventive concept as set forth in the following claims.

What is claimed is:

1. A liquid crystal display device comprising:
    an array substrate including first color filter patterns;
    a counter substrate including second color filter patterns; and
    a liquid crystal layer interposed between the array substrate and the counter substrate,
    wherein the first color filter patterns are RGB patterns and include photoresists including red, green, and blue pigments, respectively, and the second color filter patterns are RGB patterns and include photoresists including red, green, and blue pigments, respectively,
    wherein the RGB patterns of the first color filter patterns correspond to the RGB patterns of the second color filter patterns, respectively, and
    wherein the RGB patterns of the first color filter patterns and the RGB patterns of the second color filter patterns include the photoresists having different color coordinates, respectively.

2. The liquid crystal display device as claimed in claim 1, wherein the photoresists of the RGB patterns of the first color filter patterns include pigments of C.I. pigment red 177, C.I. pigment green 58, and C.I. pigment blue 15:6, respectively, and the photoresists of the RGB patterns of the second color filter patterns include pigments of C.I. pigment red 254, C.I. pigment yellow 138, and C.I. pigment violet 23, respectively.

3. The liquid crystal display device as claimed in claim 1, wherein the photoresists of the RGB patterns of the second color filter patterns include pigments of C.I. pigment red 177, C.I. pigment green 58, and C.I. pigment blue 15:6, respectively, and the photoresists of the RGB patterns of the first color filter patterns include pigments of C.I. pigment red 254, C.I. pigment yellow 138, and C.I. pigment violet 23, respectively.

4. The liquid crystal display device as claimed in claim 1, wherein
    the array substrate includes a lower substrate, gate and data lines intersecting each other to define pixel regions, a thin film transistor (TFT) connected to the gate and data lines, the first color filter patterns, and a pixel electrode connected to the TFT, and
    the counter substrate includes an upper substrate, a black matrix corresponding to the gate and data lines and the TFT, the second color filter patterns, and a common electrode covering the black matrix and the second color filter patterns.

* * * * *